(12) United States Patent
Wada

(10) Patent No.: US 10,012,414 B2
(45) Date of Patent: Jul. 3, 2018

(54) WATER HEATER

(71) Applicant: NORITZ CORPORATION, Hyogo (JP)

(72) Inventor: Norihide Wada, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 258 days.

(21) Appl. No.: 14/728,068

(22) Filed: Jun. 2, 2015

(65) Prior Publication Data

US 2016/0010891 A1     Jan. 14, 2016

(30) Foreign Application Priority Data

Jul. 11, 2014  (JP) .................................. 2014-142921
Jul. 15, 2014  (JP) .................................. 2014-145032

(51) Int. Cl.
| | | |
|---|---|---|
| *F24H 9/18* | (2006.01) | |
| *F24H 8/00* | (2006.01) | |
| *F24H 9/00* | (2006.01) | |
| *F28D 7/02* | (2006.01) | |

(52) U.S. Cl.
CPC ........... *F24H 8/006* (2013.01); *F24H 9/0026* (2013.01); *F28D 7/024* (2013.01); *Y02B 30/106* (2013.01)

(58) Field of Classification Search
CPC ...... F24H 9/0026; F28D 7/024; Y02B 30/106
USPC .......................... 122/18.4; 277/311, 602, 635
See application file for complete search history.

(56) References Cited

U.S. PATENT DOCUMENTS

| | | | | |
|---|---|---|---|---|
| 4,537,178 A | * | 8/1985 | Hwang | ................... F24H 3/065 |
| | | | | 126/110 R |
| 4,603,680 A | * | 8/1986 | Dempsey | ................. F23J 13/04 |
| | | | | 126/109 |
| 7,428,883 B2 | * | 9/2008 | Hamada | .................... F24H 1/43 |
| | | | | 122/31.1 |

(Continued)

FOREIGN PATENT DOCUMENTS

JP          S60-186617 A          9/1985

OTHER PUBLICATIONS

Decision to Grant Patent; issued by the Japanese Patent Office dated Oct. 27, 2015, which corresponds to Japanese Patent Application No. 2014-142921 and is related to U.S. Appl. No. 14/728,068; with English language translation.

(Continued)

*Primary Examiner* — Alissa Tompkins
*Assistant Examiner* — John Bargero
(74) *Attorney, Agent, or Firm* — Studebaker & Brackett PC

(57) ABSTRACT

A drainage water discharge pipe is connected to a secondary heat exchanger for discharging drainage water to the outside of the secondary heat exchanger. An air passage pipe is connected to an exhaust box. A three-way pipe joint allows merging of a flow path on a side of the drainage water discharge pipe and a flow path on a side of the air passage pipe, and allows connection of the merged flow path to a drainage water tank connection pipe. In the three-way pipe joint, the flow path on the side of the air passage pipe is greater in diameter than the flow path on the side of the drainage water discharge pipe, and the flow path on the side of the drainage water tank connection pipe is decreased in diameter after merging of the drainage water discharge pipe and the air passage pipe.

9 Claims, 12 Drawing Sheets

(56) References Cited

U.S. PATENT DOCUMENTS

| | | | |
|---|---|---|---|
| 2011/0155079 A1* | 6/2011 | Matsunaga | F24H 1/40 122/15.1 |
| 2013/0199460 A1* | 8/2013 | Duplessis | B21D 53/02 122/13.01 |
| 2014/0007822 A1* | 1/2014 | Cool | F23D 14/36 122/17.1 |

OTHER PUBLICATIONS

Decision to Grant Patent; issued by the Japanese Patent Office dated Oct. 27, 2015, which corresponds to Japanese Patent Application No. 2014-145032 and is related to U.S. Appl. No. 14/728,068; with English language translation.

* cited by examiner

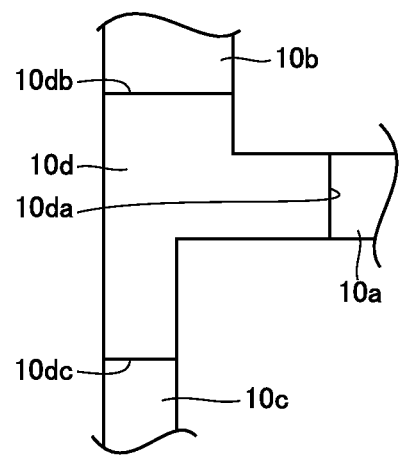
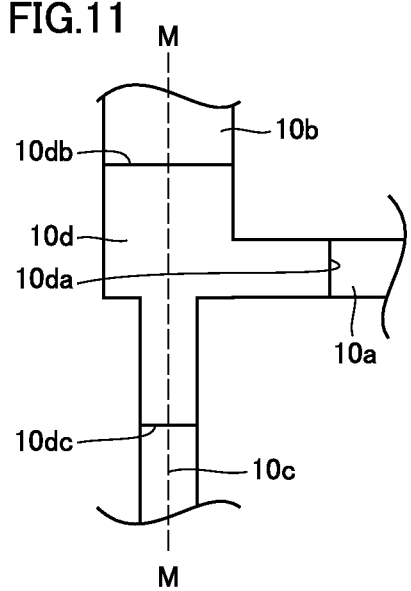

WATER HEATER

BACKGROUND OF THE INVENTION

Field of the Invention

The present invention relates to a water heater and particularly to a water heater of a latent heat recovery type capable of heating water by recovering latent heat of combustion gas.

Description of the Background Art

In replacement of an already placed tank water heater with an instantaneous water heater, there are locations where an already placed exhaust pipe (a B vent) cannot be removed from a point of view of maintaining appearance of buildings.

At such a location, a water heater can be replaced by leaving the already placed exhaust pipe and inserting an exhaust tube (a flexible exhaust tube) in the exhaust pipe. The exhaust tube should be smaller in diameter, because the exhaust tube cannot be placed in the exhaust pipe if the exhaust tube has a large outer diameter. In order to maintain a stable combustion state even when the exhaust tube is decreased in diameter, an exhaust suction and combustion system should be adopted for a water heater.

A water heater adapted to this exhaust suction and combustion system is disclosed, for example, in Japanese Patent Laying-Open No. 60-186617. In the water heater described in this publication, a heat exchanger for recovering sensible heat, a heat exchanger for recovering latent heat, and a fan are arranged in this order on a downstream side in a flow of combustion gas produced in a burner. Namely, in the water heater of this type, the fan is arranged downstream of the heat exchanger for recovering latent heat in the flow of combustion gas.

Since the fan is arranged downstream of the heat exchanger for recovering latent heat in the water heater adapted to the exhaust suction and combustion system, air (outside air) is taken in from the outside of the water heater through a discharge pipe for discharging drainage water. A direction of flow of air in this discharge pipe is reverse to a direction of discharge of drainage water through the discharge pipe. Therefore, disadvantageously, drainage water is less dischargeable through the discharge pipe to the outside of the water heater but is likely to stay in the heat exchanger for recovering latent heat.

Even though a water-seal structure capable of cutting off intake of outside air owing to drainage water being stored is adopted in a drainage water discharge path such as the discharge pipe above, air is taken in from the outside of the water heater through the discharge pipe during a period until water-seal is completed by drainage water being stored. A disadvantage the same as above is thus caused.

In addition, if a bypass is provided in a discharge path in order to decrease a flow rate of air which flows into a heat exchanger during a period until water-seal is completed, drainage water may flow into the bypass from the heat exchanger. Drainage water which has flowed into the bypass may flow into the heat exchanger again or flow to an undesirable position through the bypass.

SUMMARY OF THE INVENTION

The present invention was made in view of the problems above, and an object thereof is to provide a water heater in which drainage water is less likely to stay in a heat exchanger.

A water heater according to the present invention is a water heater of a latent heat recovery type capable of heating water by recovering latent heat of combustion gas, and includes a burner, a heat exchanger, a fan, a drainage water discharge pipe, an air passage pipe, and a pipe connection portion. The burner serves to produce combustion gas. The heat exchanger serves to heat water which flows through the inside, through heat exchange with combustion gas produced in the burner. The fan serves to suction combustion gas which has passed through the heat exchanger and to emit combustion gas to the outside of the water heater. The drainage water discharge pipe is connected to the heat exchanger for discharging drainage water produced as a result of recovery of latent heat by the heat exchanger to the outside of the heat exchanger. The air passage pipe is connected to a path for flow of combustion gas from the heat exchanger to the fan. The pipe connection portion allows merging of the drainage water discharge pipe and the air passage pipe and connection of the merged flow path to a discharge path leading to the outside of the water heater. In the pipe connection portion, a flow path on a side of the air passage pipe is greater in diameter than a flow path on a side of the drainage water discharge pipe and a flow path on a side of a discharge path is decreased in diameter after merging of the flow path on the side of the drainage water discharge pipe and the flow path on the side of the air passage pipe.

According to the water heater in the present invention, since the water heater is of an exhaust suction and combustion type, air is taken into the inside of the water heater from the outside of the water heater through the pipe connection portion. In the pipe connection portion, the flow path on the side of the air passage pipe is greater in diameter than the flow path on the side of the drainage water discharge pipe and the flow path on the side of the discharge path is decreased in diameter after merging of the drainage water discharge pipe and the air passage pipe. Therefore, air which enters the pipe connection portion passes through the flow path on the side of the discharge path and through the flow path decreased in diameter in the pipe connection portion, and thereafter flows into the flow path large in diameter. Thereafter, air is diverted to both of the flow path on the side of the drainage water discharge pipe and the flow path on the side of the air passage pipe.

In the path for flow of air in the pipe connection portion, some of air which has flowed into the flow path large in diameter from the flow path decreased in diameter stays, and thus a region where air stays (hereinafter also referred to as a "stagnation region") between the flow path on the side of the discharge path and the flow path on the side of the drainage water discharge pipe is generated. Generation of this stagnation region suppresses flow-in of air from the flow path on the side of the discharge path toward the drainage water discharge pipe. Therefore, discharge of drainage water through the drainage water discharge pipe is facilitated and drainage water is less likely to stay in the heat exchanger.

In the pipe connection portion of the water heater, the flow path on the side of the discharge path preferably extends in parallel to the flow path on the side of the air passage pipe.

Thus, air which has flowed into the discharge path from the outside of the water heater is more likely to flow into the flow path on the side of the air passage pipe from the flow path on the side of the discharge path. Therefore, drainage water is further less likely to stay in the heat exchanger.

In the pipe connection portion of the water heater, the flow path on the side of the discharge path preferably extends orthogonal to the flow path on the side of the drainage water discharge pipe.

Thus, air which has flowed into the discharge path from the outside of the water heater is less likely to flow into the flow path on the side of the drainage water discharge pipe. Therefore, drainage water is further less likely to stay in the heat exchanger.

Preferably, the water heater further includes an exhaust box forming at least a part of the path for flow of combustion gas between the heat exchanger and the fan and the air passage pipe is connected to the exhaust box.

In such a case that the air passage pipe is connected to the exhaust box as well, air which enters the inside of the water heater through the pipe connection portion from the outside of the water heater can be diverted to both of the drainage water discharge pipe and the air passage pipe from the pipe connection portion. Thus, as described above, drainage water is less likely to stay in the heat exchanger.

A water heater according to the present invention is a water heater of a latent heat recovery type capable of heating water by recovering latent heat of combustion gas, and includes a burner, a heat exchanger, a fan, a drainage water discharge pipe, an air passage pipe, and a pipe connection portion. The burner serves to produce combustion gas. The heat exchanger serves to heat water which flows through the inside, through heat exchange with combustion gas produced in the burner. The fan serves to suction combustion gas which has passed through the heat exchanger and to emit combustion gas to the outside of the water heater. The drainage water discharge pipe is connected to a drainage water discharge port provided in the heat exchanger for discharging drainage water produced as a result of recovery of latent heat by the heat exchanger to the outside of the heat exchanger. The air passage pipe is connected to an air suction port provided in a path for flow of combustion gas from the heat exchanger to the fan. The pipe connection portion has a flow path allowing merging of the drainage water discharge pipe and the air passage pipe and connection of the merged flow path to a discharge path leading to the outside of the water heater. The pipe connection portion is arranged such that a height position in the pipe connection portion where a flow path on a side of the drainage water discharge pipe and a flow path on a side of the air passage pipe merge with each other is lower than a height position of the air suction port and a hydraulic head pressure originating from a height difference between the height position where merging is achieved and the height position of the air suction port is higher than an absolute value of a maximum negative pressure generated at the air suction port.

According to the water heater in the present invention, since the water heater is of an exhaust suction and combustion type, air is taken into the inside of the water heater from the outside of the water heater through the pipe connection portion. The pipe connection portion allows merging of the drainage water discharge pipe and the air passage pipe and allows connection of the merged flow path to the discharge path leading to the outside of the water heater. Therefore, air which enters the inside of the water heater through the pipe connection portion from the outside of the water heater is diverted to both of the drainage water discharge pipe and the air passage pipe from the pipe connection portion. Thus, a flow rate of air which passes through the drainage water discharge pipe can be lower than in a case that air passes only through the drainage water discharge pipe. Therefore, discharge of drainage water through the drainage water discharge pipe is facilitated and drainage water is less likely to stay in the heat exchanger.

On the other hand, drainage water discharged from the drainage water discharge pipe may stay in the air passage pipe, without being discharged to the outside of the water heater from the side of the discharge path. This is because the air suction port is located at a position closer to the fan than the drainage water discharge port, and hence a negative pressure higher in absolute value than in the drainage water discharge pipe is generated in the air passage pipe connected to the air suction port and consequently drainage water discharged from the flow path on the side of the drainage water discharge pipe is pulled into the flow path on the side of the air passage pipe.

In the case described above, drainage water continues to be discharged from the drainage water discharge pipe and an amount of drainage water which is pulled into and stays in a flow path between a height position of merging of the flow path on the side of the drainage water discharge pipe and the flow path on the side of the air passage pipe (a merge height position) and the height position of the air suction port increases. When a level of this drainage water (a position of an upper end) reaches the height position of the air suction port, drainage water may flow into the path for flow of combustion gas through the air suction port.

In contrast, in the water heater according to the present invention, the pipe connection portion is arranged such that the merge height position is lower than the height position of the air suction port and a hydraulic head pressure originating from a height difference between the merge height position and the height position of the air suction port is higher than an absolute value of a maximum negative pressure generated at the air suction port. Thus, the hydraulic head pressure of drainage water which stays is higher than the absolute value of the maximum negative pressure generated at the air suction port before the level of the drainage water reaches the height position of the air suction port. When the hydraulic head pressure of the drainage water is higher than the absolute value of the maximum negative pressure generated at the air suction port, drainage water which has been pulled in can readily flow toward the side of the discharge path located below the air passage pipe. Therefore, drainage water can smoothly be discharged to the outside.

Preferably, in the water heater, the pipe connection portion is arranged such that the merge height position is lower than the height position of the drainage water discharge port and a hydraulic head pressure originating from a height difference between the merge height position and the height position of the drainage water discharge port is higher than the absolute value of the maximum negative pressure generated at the air suction port.

Since a negative pressure is generated at the drainage water discharge port, drainage water which has flowed out of the heat exchanger into the drainage water discharge pipe may stay in the drainage water discharge pipe without being discharged toward the discharge path. In the case described above, as drainage water continues to be discharged from the heat exchanger, an amount of drainage water which stays in a flow path between the merge height position and the height position of the drainage water discharge port increases. When a level of this drainage water (a position of an upper end) reaches the height position of the drainage water discharge port, the drainage water may flow into the heat exchanger through the drainage water discharge port.

In contrast, as the pipe connection portion is arranged at such a position that the merge height position is lower than the height position of the drainage water discharge port and a hydraulic head pressure originating from a height difference between the merge height position and the height position of the drainage water discharge port is higher than an absolute value of a maximum negative pressure generated at the air suction port, the hydraulic head pressure of drainage water which stays is higher than the absolute value of the maximum negative pressure generated at the drainage water discharge port before the level of drainage water reaches the height position of the drainage water discharge port. This is because the air suction port is located at a position closer to the fan than the drainage water discharge port and hence the absolute value of the maximum negative pressure generated at the air suction port is higher than the absolute value of the maximum negative pressure generated at the drainage water discharge port.

When the hydraulic head pressure of drainage water is higher than the absolute value of the maximum negative pressure generated at the drainage water discharge port, drainage water which stays in the drainage water discharge pipe can readily flow toward the discharge path located below the drainage water discharge pipe. Therefore, drainage water can smoothly be discharged to the outside.

Preferably, the water heater further includes an exhaust box forming at least a part of the path for flow of combustion gas between the heat exchanger and the fan and the air suction port is provided in the exhaust box.

In such a case that the air passage pipe is connected to the exhaust box as well, air which enters the inside of the water heater through the pipe connection portion from the outside of the water heater can be diverted to both of the drainage water discharge pipe and the air passage pipe from the pipe connection portion. Thus, as described above, drainage water is less likely to stay in the heat exchanger.

In the water heater above, preferably, the pipe connection portion is a pipe joint allowing merging of the drainage water discharge pipe and the air passage pipe.

Thus, the drainage water discharge pipe, the air passage pipe, and the discharge path can easily be connected to one another.

In the water heater above, preferably, the fan includes a blade, a drive source, and a rotation shaft connecting the blade and the drive source to each other and the air passage pipe opens into a region opposed to a direction of an axis line of the rotation shaft of the blade in the path for flow of combustion gas from the heat exchanger to the fan.

Thus, the air passage pipe can open into the region in the water heater where a negative pressure is high. Therefore, a flow rate of air which passes through the air passage pipe, of the drainage water discharge pipe and the air passage pipe, can be increased, and accordingly, a flow rate of air which passes through the drainage water discharge pipe can be lowered. Therefore, discharge of drainage water through the drainage water discharge pipe is further facilitated.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10 to 13 are schematic diagrams for illustrating other constructions of a pipe connection portion.

DESCRIPTION OF THE PREFERRED EMBODIMENTS

An embodiment of the present invention will be described hereinafter with reference to the drawings.

A construction of a water heater in a first embodiment of the present invention will initially be described with reference to FIGS. 1 to 5.

Figure 1:
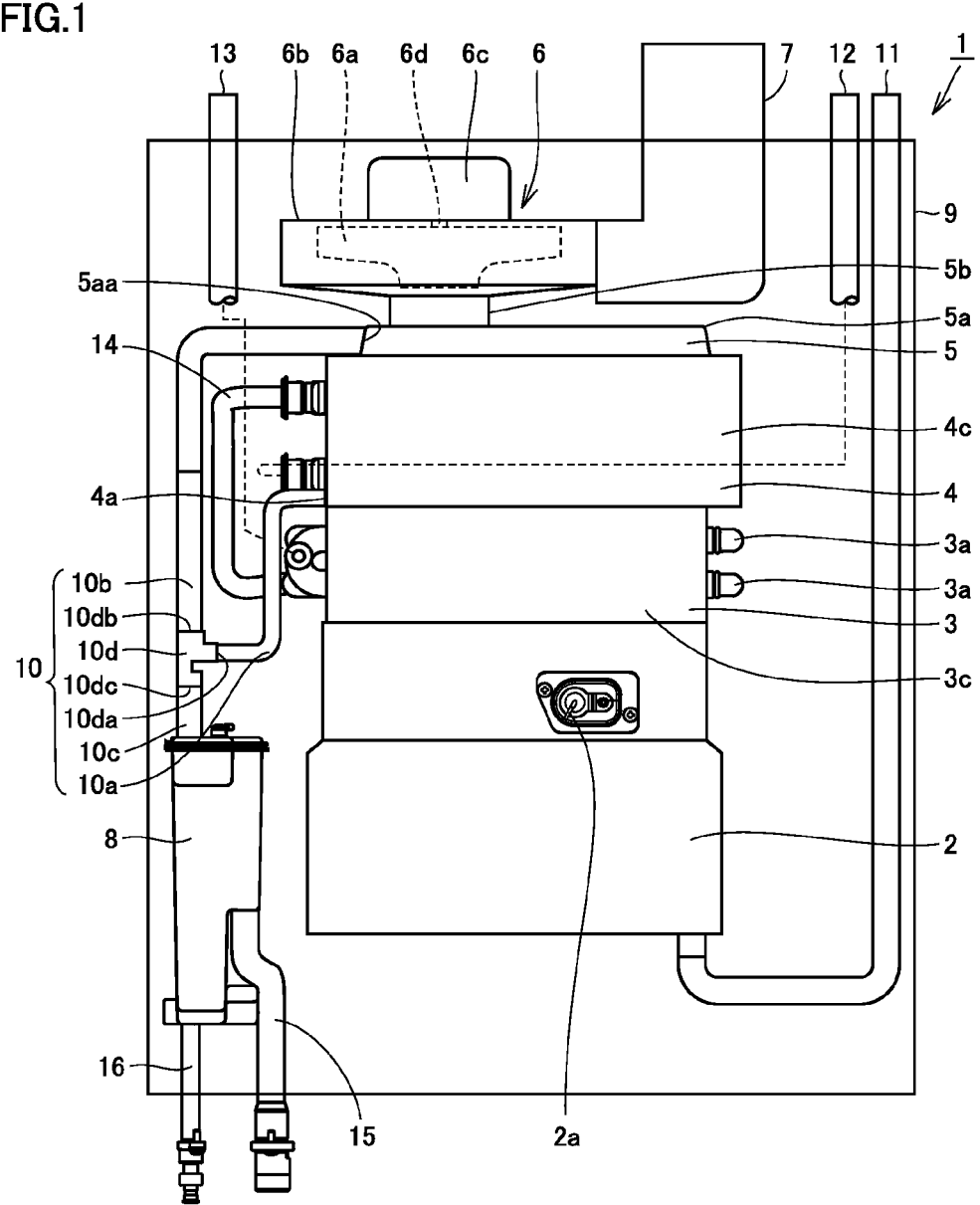
FIG. 1 is a front view schematically showing a construction of a water heater in a first embodiment of the present invention.
Figure 2:
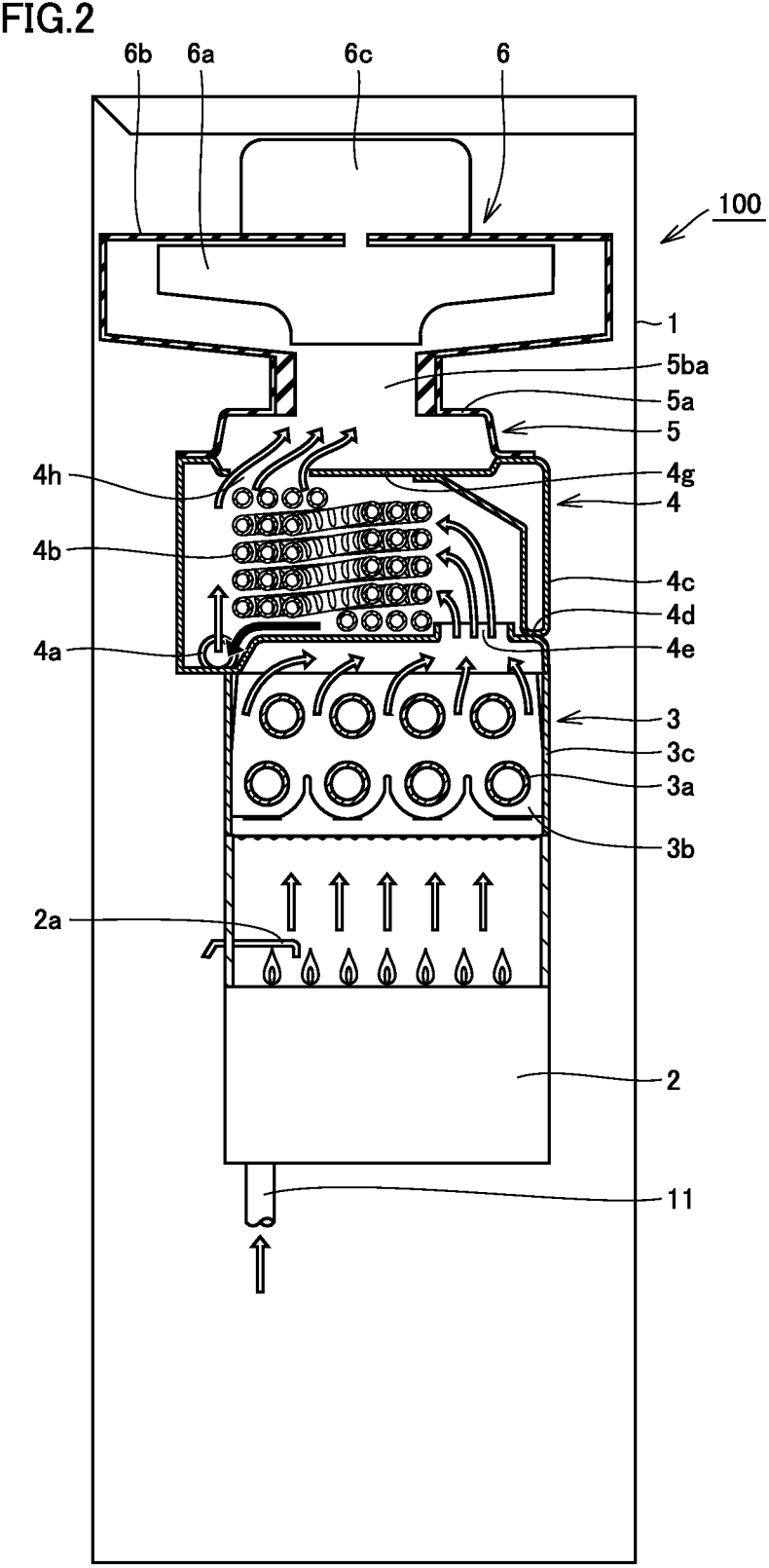
FIG. 2 is a partial cross-sectional side view schematically showing the construction of the water heater shown in FIG. 1.

Referring mainly to FIGS. 1 and 2, a water heater 1 in the present embodiment is a water heater of a latent heat recovery type adapted to an exhaust suction and combustion system. This water heater 1 mainly has a burner 2, a primary heat exchanger 3, a secondary heat exchanger 4, an exhaust box 5, a fan 6, an exhaust tube 7, a drainage water tank 8, a housing 9, and pipes 10 to 16.

Burner 2 serves to produce combustion gas by burning a fuel gas. A gas supply pipe 11 is connected to burner 2. This gas supply pipe 11 serves to supply a fuel gas to burner 2. A gas valve (not shown) implemented, for example, by an electromagnetic valve is attached to this gas supply pipe 11.

A spark plug 2a is arranged above burner 2. This spark plug 2a serves to ignite an air fuel mixture injected from burner 2 to thereby produce a flame, by generating sparks between the plug and a target (not shown) provided in burner 2. Burner 2 generates a quantity of heat by burning a fuel gas supplied from gas supply pipe 11 (which is called a combustion operation).

Referring mainly to FIG. 2, primary heat exchanger 3 is a heat exchanger of a sensible heat recovery type. This primary heat exchanger 3 mainly has a plurality of plate-shaped fins 3b, a heat conduction pipe 3a penetrating the plurality of plate-shaped fins 3b, and a case 3c accommodating fins 3b and heat conduction pipe 3a. Primary heat exchanger 3 exchanges heat with combustion gas generated by burner 2, and specifically, it serves to heat water which flows through heat conduction pipe 3a of primary heat exchanger 3 with the quantity of heat generated as a result of the combustion operation of burner 2.

Figure 3:
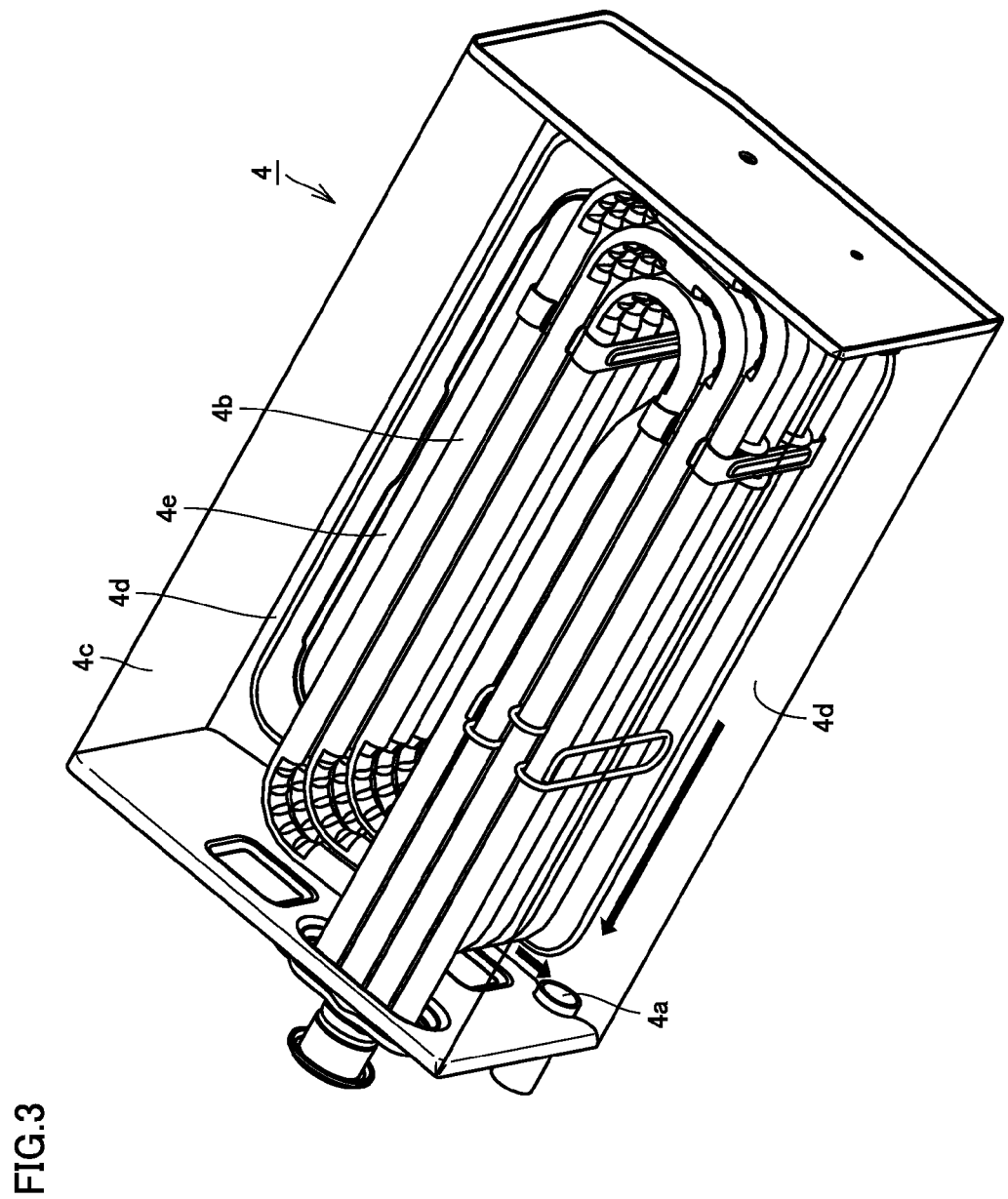
FIG. 3 is a schematic perspective view for illustrating a construction of a secondary heat exchanger of the water heater shown in FIG. 1 and a drainage water discharge path within the secondary heat exchanger.

Referring mainly to FIGS. 2 and 3, secondary heat exchanger 4 is a heat exchanger of a latent heat recovery type. This secondary heat exchanger 4 is located downstream of primary heat exchanger 3 in a flow of combustion gas and connected in series with primary heat exchanger 3 Since water heater 1 according to the present embodiment thus has secondary heat exchanger 4 of a latent heat recovery type, it is a water heater of the latent heat recovery type.

Secondary heat exchanger 4 mainly has a drainage water discharge port 4a, a heat conduction pipe 4b, a sidewall 4c, a bottom wall 4d, and an upper wall 4g. Heat conduction pipe 4b is layered as it is spirally wound. Sidewall 4c, bottom wall 4d, and upper wall 4g are arranged to surround heat conduction pipe 4b.

In secondary heat exchanger 4, water which flows through heat conduction pipe 4b is pre-heated (heated) through heat exchange with combustion gas of which heat has been exchanged in primary heat exchanger 3. As a temperature of combustion gas is lowered to approximately 60° C. through this process, moisture contained in combustion gas is condensed so that latent heat can be obtained. In addition, latent heat is recovered in secondary heat exchanger 4 and moisture contained in combustion gas is condensed, whereby drainage water is produced.

Bottom wall 4d serves as a partition between primary heat exchanger 3 and secondary heat exchanger 4, and it also serves as an upper wall of primary heat exchanger 3. This bottom wall 4d is provided with an opening portion 4e, and this opening portion 4e allows communication between a space where heat conduction pipe 3a of primary heat exchanger 3 is arranged and a space where heat conduction pipe 4b of secondary heat exchanger 4 is arranged. As shown with hollow arrows in FIG. 2, combustion gas can flow from primary heat exchanger 3 to secondary heat exchanger 4 through opening portion 4e. In this embodiment, for the sake of simplification, bottom wall 4d of secondary heat exchanger 4 and the upper wall of primary heat exchanger 3 are common, however, an exhaust collection and guide member may be connected between primary heat exchanger 3 and secondary heat exchanger 4.

Upper wall 4g is provided with an opening portion 4h, and this opening portion 4h allows communication between the space where heat conduction pipe 4b of secondary heat exchanger 4 is arranged and an internal space in exhaust box 5. As shown with hollow arrows in FIG. 2, combustion gas can flow from secondary heat exchanger 4 into the internal space in exhaust box 5 through opening portion 4h.

Drainage water discharge port 4a is provided in sidewall 4c or bottom wall 4d. This drainage water discharge port 4a opens at a lowest position in the space surrounded by side wall 4c, bottom wall 4d and upper wall 4g (a lowermost position in a vertical direction in a state of placement of the water heater), which is lower than a lowermost portion of heat conduction pipe 4b. Thus, drainage water produced in secondary heat exchanger 4 can be guided to drainage water discharge port 4a along bottom wall 4d and sidewall 4c as shown with a black arrow in FIGS. 2 and 3.

Figure 4:
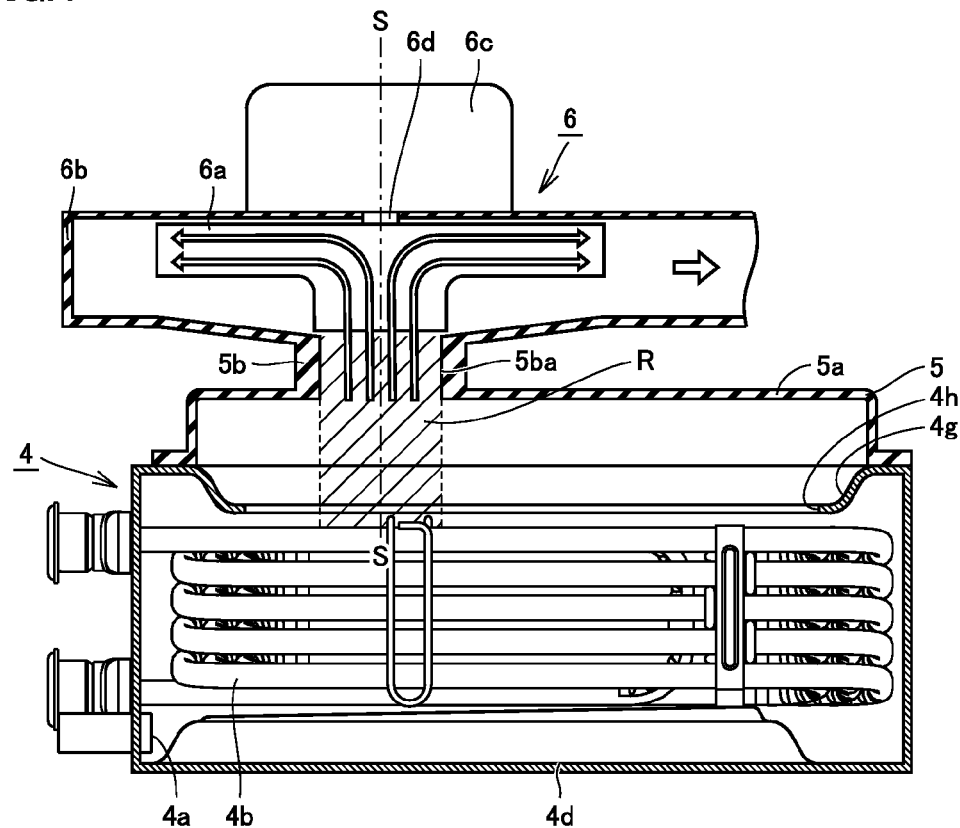
FIG. 4 is a partial cross-sectional view showing a fan and the secondary heat exchanger in an enlarged manner, for illustrating a construction of the fan of the water heater shown in FIG. 1.

Referring mainly to FIGS. 2 and 4, exhaust box 5 forms a path for a flow of combustion gas between secondary heat exchanger 4 and fan 6. This exhaust box 5 can guide combustion gas of which heat has been exchanged in secondary heat exchanger 4 to fan 6. Exhaust box 5 is attached to secondary heat exchanger 4 and located downstream of secondary heat exchanger 4 in the flow of combustion gas.

Exhaust box 5 mainly has a box main body 5a and a fan connection portion 5b. An internal space in box main body 5a communicates with the internal space where heat conduction pipe 4b of secondary heat exchanger 4 is arranged through opening portion 4h in secondary heat exchanger 4. An air suction port 5aa is provided, for example, in a side portion of box main body 5a, so as to lead to the internal space in box main body 5a. Fan connection portion 5b is provided so as to protrude from an upper portion of box main body 5a. This fan connection portion 5b has, for example, a cylindrical shape, and an internal space 5ba thereof communicates with the internal space in box main body 5a.

Referring mainly to FIGS. 1 and 2, fan 6 serves to emit combustion gas (of which heat has been exchanged in secondary heat exchanger 4) which has passed through secondary heat exchanger 4 to the outside of water heater 1 by suctioning combustion gas, and the fan is connected to exhaust tube 7 located outside water heater 1.

This fan 6 is located downstream of exhaust box 5 and secondary heat exchanger 4 in the flow of combustion gas. Namely, in water heater 1, burner 2, primary heat exchanger 3, secondary heat exchanger 4, exhaust box 5, and fan 6 are disposed in this order from upstream to downstream in the flow of combustion gas produced in burner 2. Since combustion gas is suctioned and exhausted by means of fan 6 as above in this arrangement, water heater 1 in the present embodiment is the water heater adapted to the exhaust suction and combustion system.

Fan 6 mainly has a blade 6a, a fan case 6b, a drive source 6c, and a rotation shaft 6d. Fan case 6b is attached to fan connection portion 5b of exhaust box 5 such that an internal space in fan case 6b and the internal space in fan connection portion 5b communicate with each other. Thus, as shown with hollow arrows in FIGS. 2 and 4, combustion gas can be suctioned from box main body 5a of exhaust box 5 through fan connection portion 5b into fan case 6b.

Referring mainly to FIG. 4, blade 6a is arranged in fan case 6b. This blade 6a is connected to drive source 6c with rotation shaft 6d being interposed. Thus, blade 6a is provided with drive force from drive source 6c and can rotate around rotation shaft 6d. With rotation of blade 6a, combustion gas in exhaust box 5 can be suctioned from an inner circumferential side of blade 6a and can be emitted toward an outer circumferential side of blade 6a.

Referring mainly to FIG. 1, exhaust tube 7 is arranged outside water heater 1 and is connected to an outer circumferential side of fan case 6b. Therefore, combustion gas emitted to the outer circumferential side by blade 6a of fan 6 can be emitted to the outside of water heater 1 through exhaust tube 7.

Referring mainly to FIG. 2, combustion gas produced by burner 2 as above is suctioned by fan 6 with rotation of blade 6a above, so that combustion gas can reach fan 6 after passage through primary heat exchanger 3, secondary heat exchanger 4, and exhaust box 5 in this order as shown with the hollow arrows in the figure and can be exhausted to the outside of water heater 1.

Figure 5:
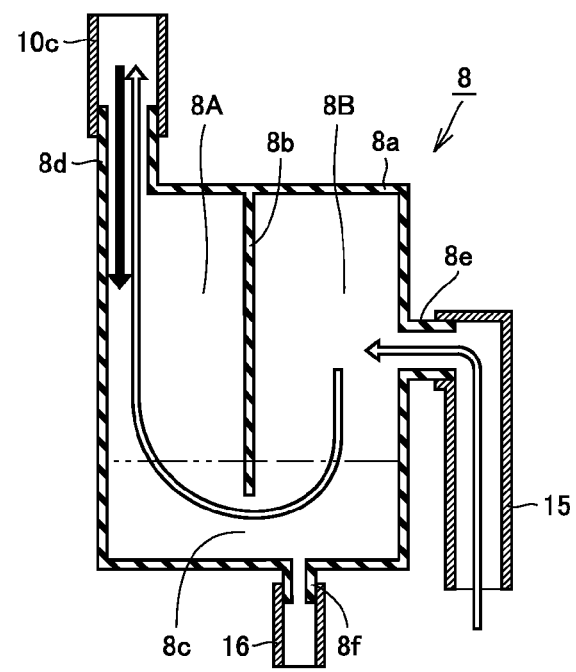
FIG. 5 is a cross-sectional view schematically showing a construction within a drainage water tank of the water heater shown in FIG. 1.

Referring mainly to FIGS. 1 and 5, drainage water tank 8 serves to store drainage water produced in secondary heat exchanger 4. This drainage water tank 8 mainly has a drainage water storage portion 8a, a drainage water introduction portion 8d, a drainage water discharge portion 8e, and a drainage water outlet port 8f.

An internal space in drainage water storage portion 8a is partitioned into spaces 8A and 8B by a wall portion 8b. Wall portion 8b serves as partition between space 8A and space 8B, and space 8A and space 8B communicate with each other through a hole 8c provided in a lower portion of wall portion 8b. Drainage water introduction portion 8d is provided in a top portion of drainage water storage portion 8a so as to lead to space 8A, and drainage water discharge portion 8e is provided at a prescribed height position in drainage water storage portion 8a so as to lead to space 8B.

This drainage water tank 8 has a water-seal structure. Namely, drainage water tank 8 is constructed such that, as a level of drainage water stored in a lower portion of each of space 8A and space 8B is higher than an upper end of hole 8c as shown with a chain double dotted line in the figure, outside air (air outside water heater 1) which entered drainage water tank 8 through drainage water discharge portion 8e does not come toward drainage water introduction portion 8d. With such a water-seal structure of drainage water tank 8, entry of outside air into water heater 1 through drainage water tank 8 as shown with hollow arrows in the figure is prevented.

In a bottom portion of drainage water tank 8 (space 8B), drainage water outlet port 8f is provided. Drainage water outlet piping 16 (which is normally closed) is connected to this drainage water outlet port 8f and leads to the outside of water heater 1. Drainage water outlet piping 16 is designed so as to be able to discharge drainage water within drainage water tank 8 which cannot be discharged through drainage water discharge piping 15, by opening drainage water outlet piping 16 during maintenance. An internal space in drainage water tank 8 may be filled with a neutralization agent (not shown) for neutralizing acid drainage water.

Pipe 10 which will be described later is connected between drainage water discharge port 4a of secondary heat exchanger 4 and drainage water introduction portion 8d of drainage water tank 8 in order to discharge drainage water within secondary heat exchanger 4 to the outside. Drainage water discharge piping 15 is connected to drainage water discharge portion 8e of drainage water tank 8 and leads to the outside of water heater 1. Drainage water stored in drainage water tank 8 is temporarily stored in the internal space in drainage water tank 8 and thereafter, normally, it is discharged through drainage water discharge piping 15 to the outside of water heater 1.

Figure 6:
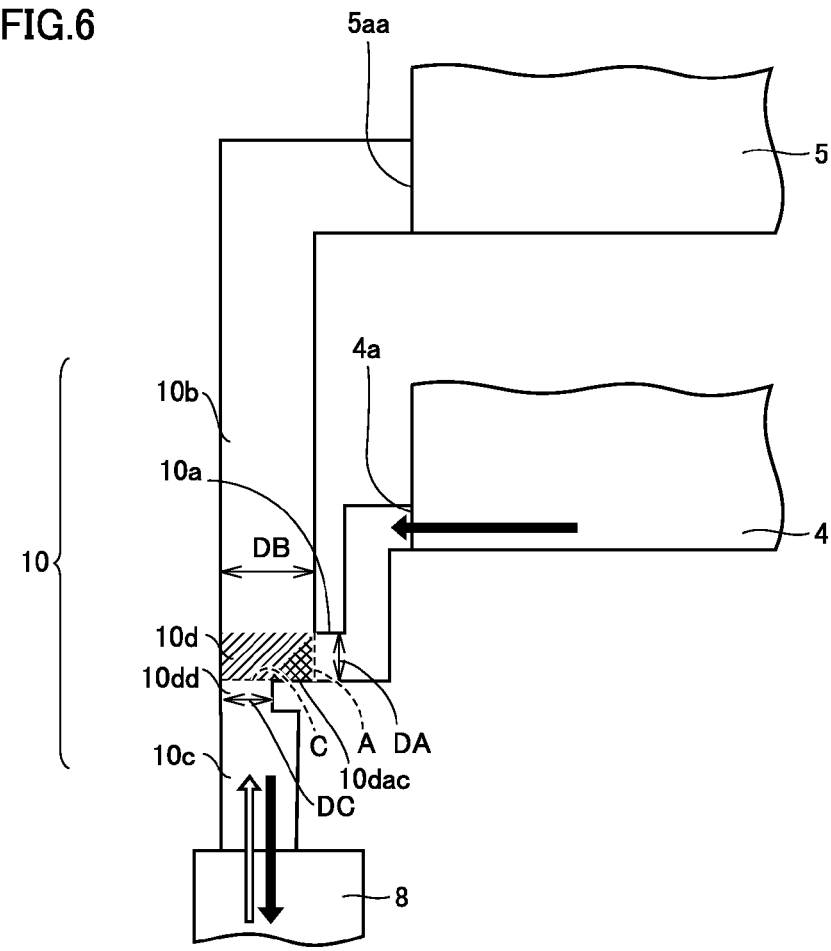
FIG. 6 is a schematic diagram for illustrating ease in discharge of drainage water in the water heater in the first embodiment of the present invention.

Referring mainly to FIGS. 1 and 6, a drainage water discharge pipe 10a, a drainage water tank connection pipe 10c, and a three-way pipe joint (pipe connection portion) 10d connect this drainage water tank 8 and drainage water discharge port 4a of secondary heat exchanger 4 to each other. Drainage water discharge pipe 10a has one end connected to drainage water discharge port 4a of secondary heat exchanger 4 and the other end connected to an opening portion 10da of three-way pipe joint 10d. Drainage water tank connection pipe 10c has one end connected to an opening portion 10dc of three-way pipe joint 10d and the other end connected to drainage water introduction portion 8d (FIG. 5) of drainage water tank 8. One end of air passage pipe 10b is connected to air suction port 5aa of exhaust box 5, and the other end of air passage pipe 10b is connected to an opening portion 10db of three-way pipe joint 10d.

With arrangement above, in three-way pipe joint 10d, a flow path on a side of opening portion 10da connected to drainage water discharge pipe 10a (a flow path on a side of the drainage water discharge pipe), a flow path on a side of opening portion 10db connected to air passage pipe 10b (a flow path on a side of the air passage pipe), and a flow path on a side of opening portion 10dc connected to drainage water tank connection pipe 10c (a flow path on a side of a discharge path) are coupled to one another. Namely, three-way pipe joint 10d can allow merging of air passage pipe 10b and drainage water discharge pipe 10a (merging of the flow path on the side of air passage pipe 10b and the flow path on the side of drainage water discharge pipe 10a) and allow connection of the merged flow path to the discharge path leading to the outside of water heater 1. In the present embodiment, the discharge path is mainly constituted of drainage water tank connection pipe 10c and drainage water tank 8.

Drainage water discharge pipe 10a, air passage pipe 10b, drainage water tank connection pipe 10c, and three-way pipe joint 10d constitute pipe 10 for drainage water and air, which is branched from drainage water tank 8 and connected to both of secondary heat exchanger 4 and exhaust box 5. A region where the flow path on the side of air passage pipe 10b and the flow path on the side of drainage water discharge pipe 10a merge with each other is also hereinafter referred to as a "merge region" (hatched and shaded regions in FIG. 6).

In pipe 10 for drainage water and air, drainage water produced in secondary heat exchanger 4 is guided to drainage water discharge port 4a, thereafter it flows through the flow path on the side of drainage water discharge pipe 10a and flows into the merge region, thereafter it flows through the flow path on the side of drainage water tank connection pipe 10c, and it is discharged to the outside of the water heater. Before drainage water tank 8 is water-sealed, air outside water heater 1 flows through the flow path on the side of drainage water tank connection pipe 10c and flows into the merge region, and thereafter it is diverted toward drainage water discharge pipe 10a and toward air passage pipe 10b.

In pipe 10 for drainage water and air, drainage water discharge pipe 10a extends horizontally or as inclined downward from drainage water discharge port 4a to three-way pipe joint 10d, in order to allow drainage water to smoothly flow from secondary heat exchanger 4 toward drainage water tank 8. An angle formed between the flow path on the side of drainage water tank connection pipe 10c and the flow path on the side of air passage pipe 10b in three-way pipe joint 10d is closer to 180° than an angle formed between the flow path on the side of drainage water tank connection pipe 10c and the flow path on the side of drainage water discharge pipe 10a, in order to allow air which flows from the discharge path to smoothly flow into the flow path on the side of air passage pipe 10b.

Referring to FIG. 6, in three-way pipe joint 10d, a diameter DB of the flow path on the side of air passage pipe 10b is greater than a diameter DA of the flow path on the side of drainage water discharge pipe 10a, and the flow path on the side of drainage water tank connection pipe 10c is decreased in diameter after merging of drainage water discharge pipe 10a and air passage pipe 10b. Namely, a smaller-diameter portion 10dd is provided in the flow path on the side of drainage water tank connection pipe 10c in three-way pipe joint 10d. A diameter of the region decreased in diameter is defined as a diameter DC.

Smaller-diameter portion 10dd is formed by providing a wall portion 10dac serving as a partition in the merge region between a wall portion serving as a partition of the flow path on the side of drainage water tank connection pipe 10c and a wall portion serving as a partition of the flow path on the side of drainage water discharge pipe 10a such that a virtual surface of contact C between the flow path on the side of drainage water tank connection pipe 10c and the merge region and a virtual surface of contact A between the flow path on the side of drainage water discharge pipe 10a and the merge region are away from each other. Thus, contact surface A and contact surface C are not in contact with each other.

As shown in FIG. 6, in three-way pipe joint 10d according to the present embodiment, the flow path thereof is made smaller immediately after merging of the flow path on the side of drainage water discharge pipe 10a and the flow path on the side of air passage pipe 10b. Here, "immediately after" means decrease in size at a height position as high as a height position of a lower end of contact surface A (a position in contact surface A closest to the flow path on the side of drainage water tank connection pipe 10c) in the flow path on the side of drainage water tank connection pipe 10c.

Referring mainly to FIGS. 1 and 2, water supply pipe 12 is connected to one end of heat conduction pipe 4b of secondary heat exchanger 4 and hot water delivery pipe 13 is connected to one end of heat conduction pipe 3a of primary heat exchanger 3. The other end of heat conduction pipe 3a of primary heat exchanger 3 and the other end of heat conduction pipe 4b of secondary heat exchanger 4 are connected to each other through connection pipe 14. Each of gas supply pipe 11, water supply pipe 12, and hot water delivery pipe 13 leads to the outside, for example, in a top portion of water heater 1. Burner 2, primary heat exchanger 3, secondary heat exchanger 4, exhaust box 5, fan 6, and drainage water tank 8 are arranged in housing 9.

A function and effect of the water heater in the present embodiment will now be described in comparison with a first comparative example and a second comparative example 2 shown in FIGS. 7 and 8.

Figure 7:
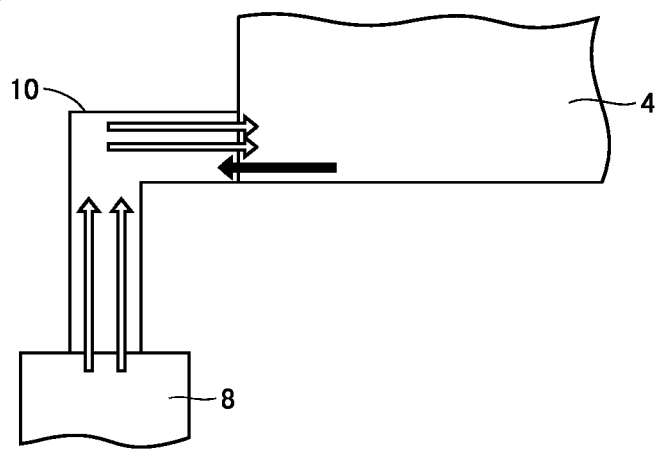
FIG. 7 is a schematic diagram for illustrating difficulty in discharge of drainage water in a water heater in a first comparative example.

Initially, in a water heater in the first comparative example shown in FIG. 7, pipe 10 for discharge of drainage water which connects drainage water tank 8 and secondary heat exchanger 4 to each other is not branched. Since the comparative example is otherwise substantially the same as the water heater in the present embodiment described above, description thereof will not be repeated.

The water heater in this comparative example is a water heater adapted to the exhaust suction and combustion system similar to water heater 1 in the present embodiment shown in FIG. 1. In the water heater adapted to this system, as shown in FIG. 1, fan 6 is arranged downstream of secondary heat exchanger 4 for recovering latent heat in the flow of combustion gas. Therefore, during a period until drainage water tank 8 is water-sealed, air outside the water heater is taken into the inside of secondary heat exchanger 4 through a drainage water discharge path (drainage water discharge piping 15, drainage water tank 8, drainage water tank connection pipe 10c, three-way pipe joint 10d, and drainage water discharge pipe 10a).

Therefore, as shown in FIG. 7, a direction of flow of air within pipe 10 for discharge of drainage water (hollow arrows in the figure) is reverse to a direction of discharge of drainage water (a black arrow in the figure). Therefore, drainage water is less dischargeable toward drainage water tank 8 through pipe 10 for discharge of drainage water and is likely to stay in secondary heat exchanger 4.

If discharge of drainage water within secondary heat exchanger 4 does not proceed but drainage water is stored, drainage water may run over toward primary heat exchanger 3 through opening portion 4e shown in FIG. 2. In this case, overflow drainage water may corrode heat conduction pipe 3a of primary heat exchanger 3 composed, for example, of copper, or corrode burner 2 composed, for example, of stainless steel, or extinguish a flame of burner 2.

In contrast, according to water heater 1 in the present embodiment, as shown in FIG. 6, the other end of pipe 10 having one end connected to drainage water tank 8 is branched and connected to both of secondary heat exchanger 4 and exhaust box 5. Therefore, air which enters water heater 1 from the outside of water heater 1 is divided into air which enters secondary heat exchanger 4 and air which enters exhaust box 5. Thus, a flow rate of air which enters secondary heat exchanger 4 (air which passes through drainage water discharge pipe 10a) can be lower than a flow rate in drainage water tank connection pipe 10c. Therefore, discharge of drainage water toward drainage water tank 8 through drainage water discharge pipe 10a is facilitated and drainage water is less likely to stay in secondary heat exchanger 4.

As shown in FIG. 1, air passage pipe 10b is connected to exhaust box 5. This exhaust box 5 is located closer to fan 6 than secondary heat exchanger 4. Therefore, a negative pressure in the internal space in exhaust box 5 is higher than in the internal space in secondary heat exchanger 4. Thus, since an amount of air which enters secondary heat exchanger 4 can be smaller than an amount of air which enters exhaust box 5, discharge of drainage water through drainage water discharge pipe 10a is further facilitated and drainage water is less likely to stay in secondary heat exchanger 4.

As shown further in FIG. 6, in three-way pipe joint 10d, diameter DB of the flow path on the side of air passage pipe 10b is greater than diameter DA of the flow path on the side of drainage water discharge pipe 10a, and the flow path on the side of drainage water tank connection pipe 10c has smaller-diameter portion 10dd decreased in diameter after merging of drainage water discharge pipe 10a and air passage pipe 10b. Therefore, air which has reached the flow path on the side of drainage water tank connection pipe 10c of three-way pipe joint 10d from the outside of water heater 1 through drainage water discharge piping 15, drainage water tank 8, and drainage water tank connection pipe 10c passes through this smaller-diameter portion 10dd, thereafter flows into the merge region greater in diameter than diameter DC of smaller-diameter portion 10dd, and thereafter it is divided into air which flows toward secondary heat exchanger 4 and air which flows toward exhaust box 5.

In an air flow-in path above, a diameter of the flow path abruptly changes at the time of flow-in from smaller-diameter portion 10dd into the merge region, and hence a direction of flow of air or a speed of flow significantly changes between the upstream side and the downstream side of the region where the diameter is changed. This change generates a stagnation region where air stays, because some of air flows as swirling owing to such change. This stagnation region is likely to be generated in a region where a diameter of a flow path abruptly increases in a direction of flow of air.

Figure 8:
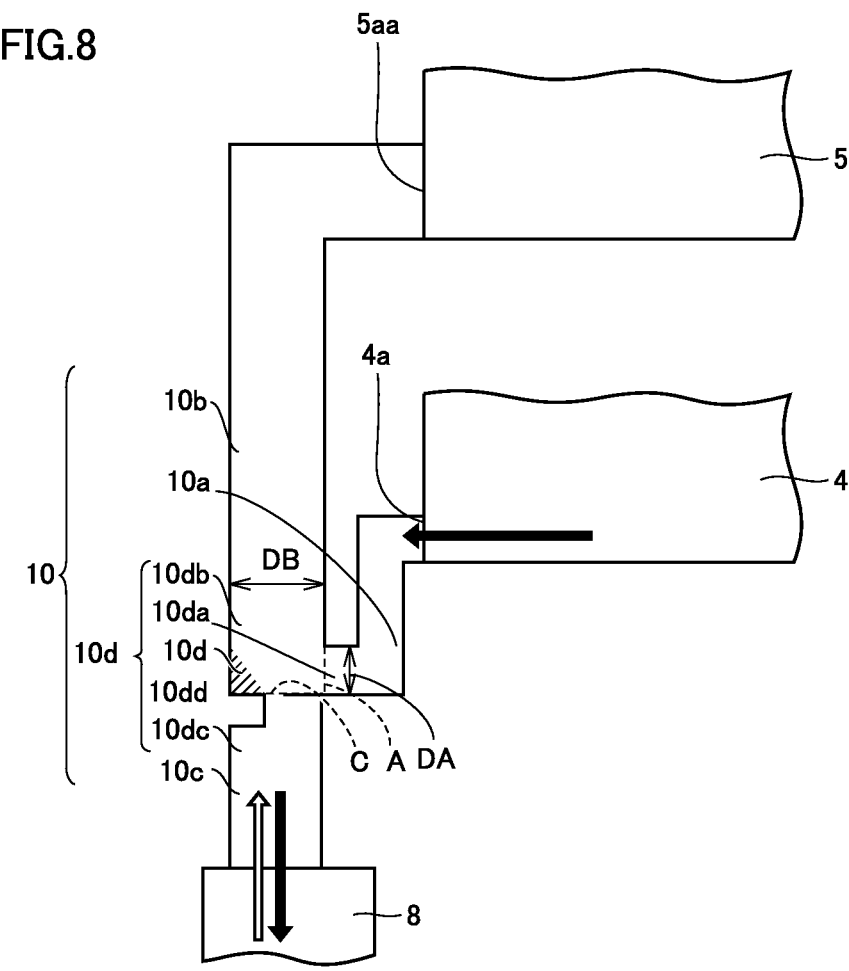
FIG. 8 is a schematic diagram for illustrating difficulty in discharge of drainage water in a water heater in a second comparative example.

If smaller-diameter portion 10dd is provided while contact surface A and contact surface C are in contact with each other as in the water heater in the second comparative example shown in FIG. 8, the stagnation region is likely to be generated in a hatched region in FIG. 8. Since the comparative example is otherwise substantially the same as the water heater in the present embodiment described above, description thereof will not be repeated. Since this stagnation region is not located between the flow path on the side of drainage water tank connection pipe 10c and the flow path on the side of drainage water discharge pipe 10a, stay of air in this stagnation region cannot sufficiently suppress a flow of air from the flow path on the side of drainage water tank connection pipe 10c toward the flow path on the side of drainage water discharge pipe 10a.

In contrast, according to water heater 1 in the present embodiment, smaller-diameter portion 10dd is provided such that contact surface A and contact surface C are away from each other as shown in FIG. 6. In this case, the stagnation region is likely to be generated in a shaded region in FIG. 6. Since this stagnation region is located between the flow path on the side of drainage water tank connection pipe 10c and the flow path on the side of drainage water discharge pipe 10a, stay of air at this position suppresses a flow of air from the flow path on the side of drainage water tank connection pipe 10c toward the flow path on the side of drainage water discharge pipe 10a. Therefore, discharge of drainage water from the side of drainage water discharge pipe 10a is particularly facilitated and hence drainage water is less likely to stay in secondary heat exchanger 4.

Though a degree of decrease in size of smaller-diameter portion 10dd is not particularly restricted, in order to generate a stagnation region which can sufficiently suppress a flow of air toward drainage water discharge pipe 10a (that is, in order to abruptly change a diameter), diameter DC of smaller-diameter portion 10dd is preferably at most 0.7 time as large as a diameter of the merge region (corresponding to diameter DB in the present embodiment).

In water heater 1 in the present embodiment described above, the flow path on the side of drainage water tank connection pipe 10c extends in parallel to the flow path on the side of air passage pipe 10b. Namely, an angle formed between these flow paths is preferably set approximately to 180°. In this case, air which flows through the air flow-in path can particularly smoothly flow from the side of drainage water tank connection pipe 10c toward air passage pipe 10b. Therefore, since an amount of air which flows toward drainage water discharge pipe 10a can further be decreased, drainage water is less likely to stay in secondary heat exchanger 4.

In water heater 1 according to the present embodiment described above, the flow path on the side of drainage water tank connection pipe 10c extends orthogonal to the flow path on the side of drainage water discharge pipe 10a. Namely, an angle formed between these flow paths is preferably set approximately to 90°. In this case, flow-in of air from the side of drainage water tank connection pipe 10c toward drainage water discharge pipe 10a is considerably suppressed.

If diameter DC of smaller-diameter portion 10dd of three-way pipe joint 10d is greater than diameter DA of the flow path on the side of drainage water discharge pipe 10a in the present embodiment, in spite of generation of a stagnation region between the flow path on the side of drainage water tank connection pipe 10c and the flow path on the side of drainage water discharge pipe 10a, it tends to be difficult to sufficiently decrease a flow rate of air into the flow path on the side of drainage water discharge pipe 10a with the stagnation region, because the flow path on the side of drainage water discharge pipe 10a is great in size relative to the generated stagnation region.

In contrast, when diameter DC of smaller-diameter portion 10dd of three-way pipe joint 10d is not greater than diameter DA of the flow path on the side of drainage water discharge pipe 10a, suppression of flow-in of air by the stagnation region is sufficient. When diameter DC of smaller-diameter portion 10dd is comparable to diameter DA of the flow path on the side of drainage water discharge pipe 10a, a size of pipes can advantageously be unified.

In the construction shown in FIG. 1, though air passage pipe 10b is connected to box main body 5a of exhaust box 5, air passage pipe 10b should only be connected to a path for flow of combustion gas from secondary heat exchanger 4 until fan 6. Here, the "path for flow of combustion gas from secondary heat exchanger 4 until fan 6" means a space in which combustion gas flows within secondary heat exchanger 4 and exhaust box 5 in FIG. 1. When a constituent member other than exhaust box 5 is provided in between secondary heat exchanger 4 and fan 6, a space in that constituent member in which combustion gas flows is also encompassed.

Figure 9:
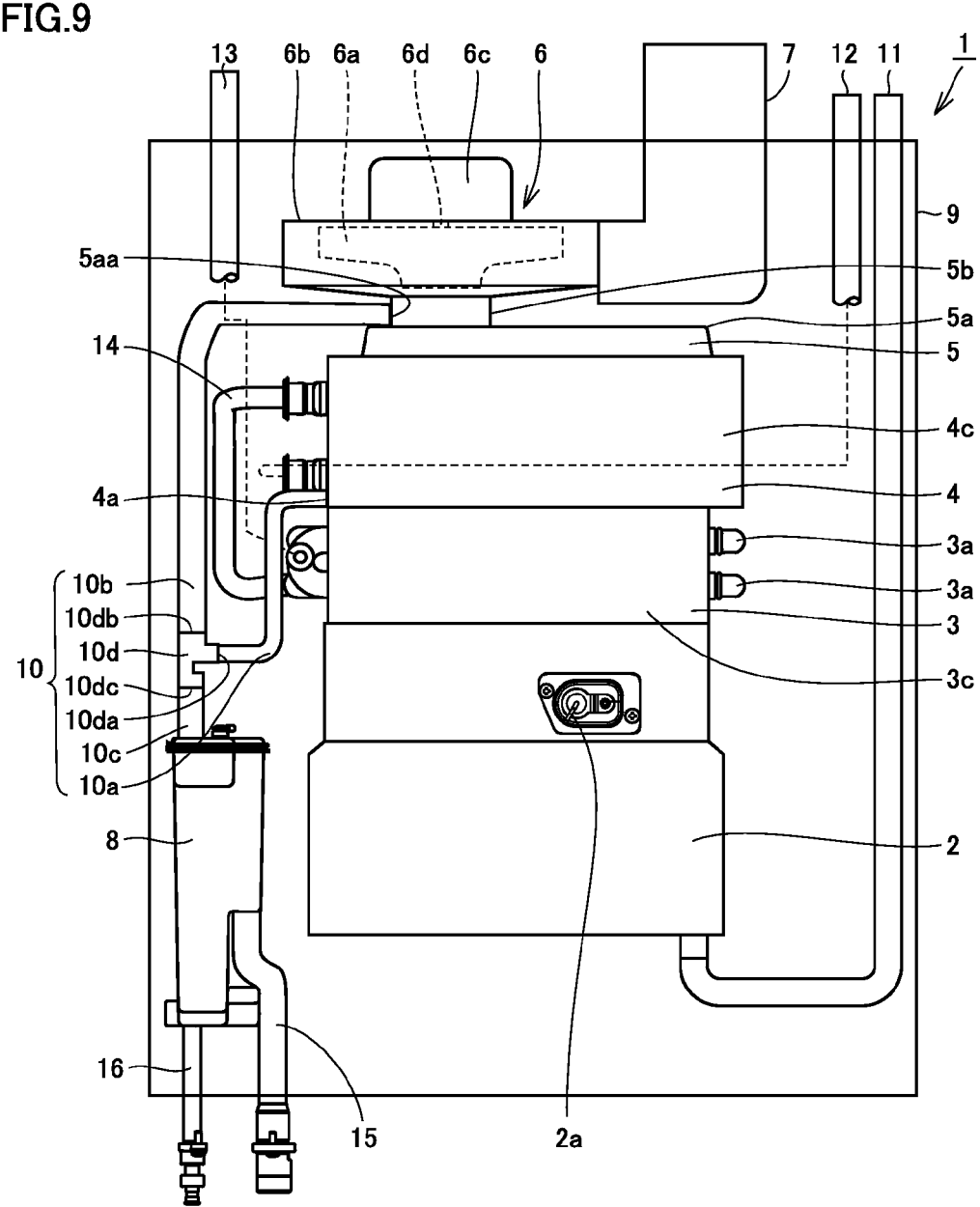
FIG. 9 is a front view schematically showing connection of the air passage pipe to a connection portion connecting an exhaust box and the fan to each other.

For example, as shown in FIG. 9, air passage pipe 10b may be connected to fan connection portion 5b instead of box main body 5a of exhaust box 5. By thus connecting air passage pipe 10b to fan connection portion 5b of exhaust box 5, the air passage pipe can be connected to exhaust box 5 at a position closer to fan 6 than in the case that the air passage pipe is connected to box main body 5a.

Thus, air passage pipe 10b can open into a region higher in negative pressure than in the case that the air passage pipe is connected to box main body 5a. Therefore, a flow rate of air which passes through air passage pipe 10b, of drainage water discharge pipe 10a and air passage pipe 10b, can be higher, and a flow rate of air which passes through drainage water discharge pipe 10a can further be lowered. Therefore, discharge of drainage water through drainage water discharge pipe 10a is further facilitated.

Referring to FIG. 4, air passage pipe 10b preferably opens into a region R opposed to blade 6a in a direction of an axis line S-S of rotation shaft 6d (a hatched region in the figure) in the path for flow of combustion gas from secondary heat exchanger 4 until fan 6. Specifically, air passage pipe 10b preferably opens into region R which is combination of an internal space 5ba in fan connection portion 5b and a region formed by extending that internal space 5ba in the direction of axis line S-S of rotation shaft 6d (a hatched region in the figure).

Since this region R is a region opposed to blade 6a of fan 6 which suctions combustion gas, it is a region high in negative pressure. Therefore, as air passage pipe 10b opens into this region R, a flow rate of air which is taken into water heater 1 through air passage pipe 10b can be made higher, and accordingly, a flow rate of air which passes through drainage water discharge pipe 10a can further be lowered. Therefore, discharge of drainage water through the drainage water discharge pipe is further facilitated.

For example, as shown in FIG. 9, by connecting air passage pipe 10b to fan connection portion 5b of exhaust box 5, air passage pipe 10b can open into region R high in negative pressure above.

Since water heater 1 adapted to the exhaust suction and combustion system is employed as described above in the present embodiment, a combustion operation by burner 2 can be stabilized as compared with a water heater of what is called a forced exhaust type even though exhaust tube 7 is decreased in diameter, which will be described below.

In a water heater of what is called a forced exhaust type, a fan, a burner, a primary heat exchanger, and a secondary heat exchanger are arranged in this order from upstream to downstream in a flow of combustion gas. Namely, combustion gas produced in the burner is caused to flow into an exhaust tube outside the water heater by the fan through the primary heat exchanger and the secondary heat exchanger.

Combustion gas forced out of the fan receives flow path resistance produced by the primary heat exchanger and the secondary heat exchanger before it reaches the exhaust tube. Therefore, a pressure with which combustion gas is sent immediately before the exhaust tube is lower by magnitude comparable to this flow path resistance. Therefore, in order to force combustion gas into the exhaust tube smaller in diameter, a fan blow pressure should be raised. When a fan blow pressure is raised, however, an internal pressure within a burner case becomes higher. Therefore, when a supply pressure of combustion gas supplied to the burner is low, a combustion operation becomes unstable.

In contrast, according to the exhaust suction and combustion system in the present embodiment, burner 2, primary heat exchanger 3, secondary heat exchanger 4, and fan 6 are arranged in this order from upstream to downstream in the flow of combustion gas. With this system, since a pressure is negative on the upstream side of fan 6, an internal pressure within the burner case can be maintained low even though exhaust tube 7 is decreased in diameter. Thus, a combustion operation can be stabilized even when a supply pressure of combustion gas supplied to burner 2 is low.

In the present embodiment described above in detail, though water heater 1 including pipe 10 in which smaller-diameter portion 10$dd$ is provided in a part of the flow path on the side of drainage water tank connection pipe 10$c$ has been illustrated and described, an embodiment of the present invention is not limited thereto. For example, as shown in FIG. 10, the entire flow path on the side of drainage water tank connection pipe 10$c$ of three-way pipe joint 10$d$ may be made smaller, and in addition, drainage water tank connection pipe 10$c$ continuing to smaller-diameter portion 10$dd$ may be comparable in diameter to the flow path on the side of drainage water tank connection pipe 10$c$. According to this feature as well, as described above, drainage water is less likely to stay in secondary heat exchanger 4 and manufacturing of three-way pipe joint 10$d$ is also facilitated.

Alternatively, as shown in FIG. 11, three-way pipe joint 10$d$ may be constructed such that a central axis of the flow path on the side of drainage water tank connection pipe 10$c$ matches with a central axis of the flow path on the side of air passage pipe 10$b$ (an axis line M-M in the figure). According to this feature as well, as described above, drainage water is less likely to stay in secondary heat exchanger 4 and manufacturing of three-way pipe joint 10$d$ is also further facilitated.

Figure 12:
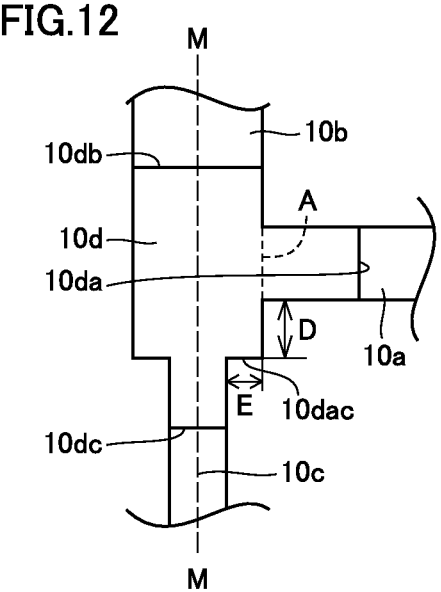

Alternatively, as shown in FIG. 12, a lower portion of three-way pipe joint 10$d$ extending from a lower end of contact surface A in the figure (a position in contact surface A closest to the flow path on the side of drainage water tank connection pipe 10$c$) by a prescribed distance D may be made smaller. In this case as well, a stagnation region is generated between the flow path on the side of drainage water tank connection pipe 10$c$ and the flow path on the side of drainage water discharge pipe 10$a$, and hence drainage water is less likely to stay in secondary heat exchanger 4. Though this prescribed distance D is not particularly restricted, as shown in FIG. 12, a condition of E>D is preferably satisfied, where E represents a distance of wall portion 10$dac$ serving as the partition of the merge region provided between the wall portion serving as the partition of the flow path on the side of drainage water tank connection pipe 10$c$ and the wall portion serving as the partition of the flow path on the side of drainage water discharge pipe 10$a$. Distance E corresponds to a length of a normal extended from an end portion of wall portion 10$dac$ (a left end portion in the figure) to a surface including contact surface A.

Figure 13:
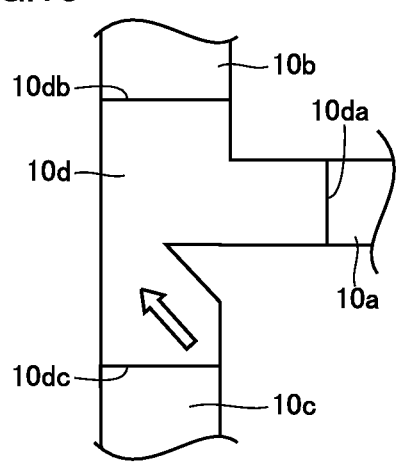

Alternatively, as shown in FIG. 13, after abrupt decrease of a diameter of three-way pipe joint 10$d$, it may continuously increase toward drainage water tank connection pipe 10$c$ after merging of drainage water discharge pipe 10$a$ and air passage pipe 10$b$ ("immediately after merging" in FIG. 13). In this case, when air flows from the side of drainage water tank connection pipe 10$c$ toward the merge region, some of air travels in a direction shown with a hollow arrow in the figure. An angle formed between this direction of flow of air and the direction of the flow path on the side of air passage pipe 10$b$ is relatively small, whereas an angle formed between this direction of flow of air and the direction of the flow path on the side of drainage water discharge pipe 10$a$ is relatively large. According to such a construction, a flow rate of air which flows toward drainage water discharge pipe 10$a$ is further decreased. Therefore, drainage water is further less likely to stay in secondary heat exchanger 4.

Since the constructions in FIGS. 10 to 13 are otherwise substantially the same as the construction of water heater 1 shown in FIGS. 1 to 5, the same elements have the same reference characters allotted and description thereof will not be repeated.

A construction of a water heater in a second embodiment of the present invention will now be described with reference to FIGS. 14 and 15. Water heater 1 in the present embodiment is substantially the same as the water heater in the first embodiment described above except for a drain trap 8 ("drainage water tank 8" in the first embodiment) and pipe 10 for drainage water and air. Therefore, the same description will not be repeated and a construction of drain trap 8 and pipe 10 will be described below.

Figure 14:
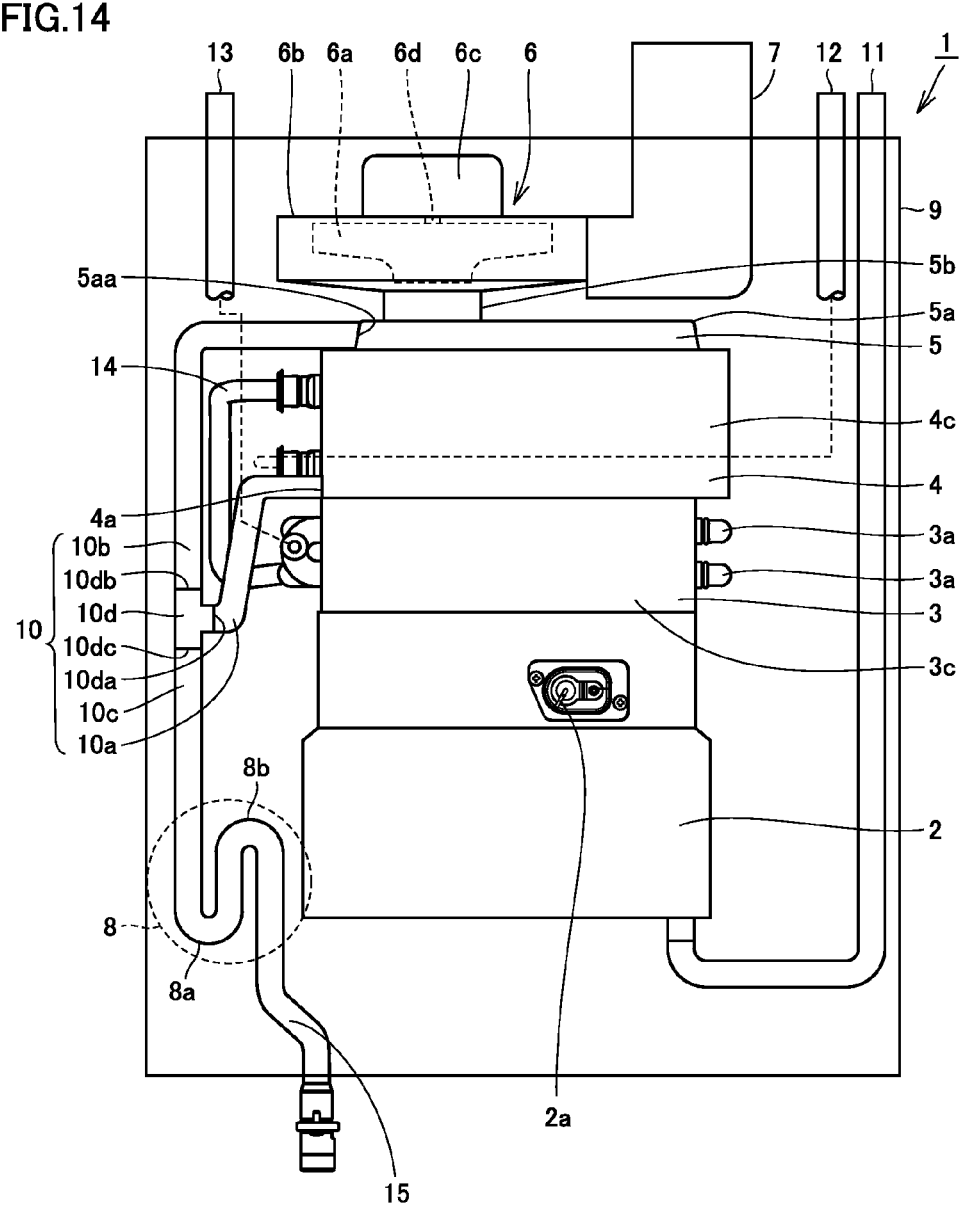
FIG. 14 is a front view schematically showing a construction of a water heater in a second embodiment of the present invention.

Referring mainly to FIG. 14, drain trap 8 is a drain trap which can water-seal a flow path with drainage water and it serves to store drainage water produced in secondary heat exchanger 4. Drain trap 8 mainly has a bent portion 8$a$ and a bent portion 8$b$. Drain trap 8 has one end leading to secondary heat exchanger 4 through pipe 10 which will be described later and the other end connected to drainage water discharge piping 15 communicating with the outside.

Drainage water which has flowed into drain trap 8 from secondary heat exchanger 4 is stored from a lower portion of bent portion 8$a$. When a water level is higher than an upper end of a flow path located in the lower portion of bent portion 8$a$, outside air which has entered bent portion 8$b$ of drain trap 8 from drainage water discharge piping 15 (air outside water heater 1) cannot flow toward drainage water discharge pipe 10$a$ through bent portion 8$a$ of drain trap 8. This water-seal structure of drain trap 8 can prevent entry of outside air into the inside of water heater 1 through drain trap 8.

Figure 15:
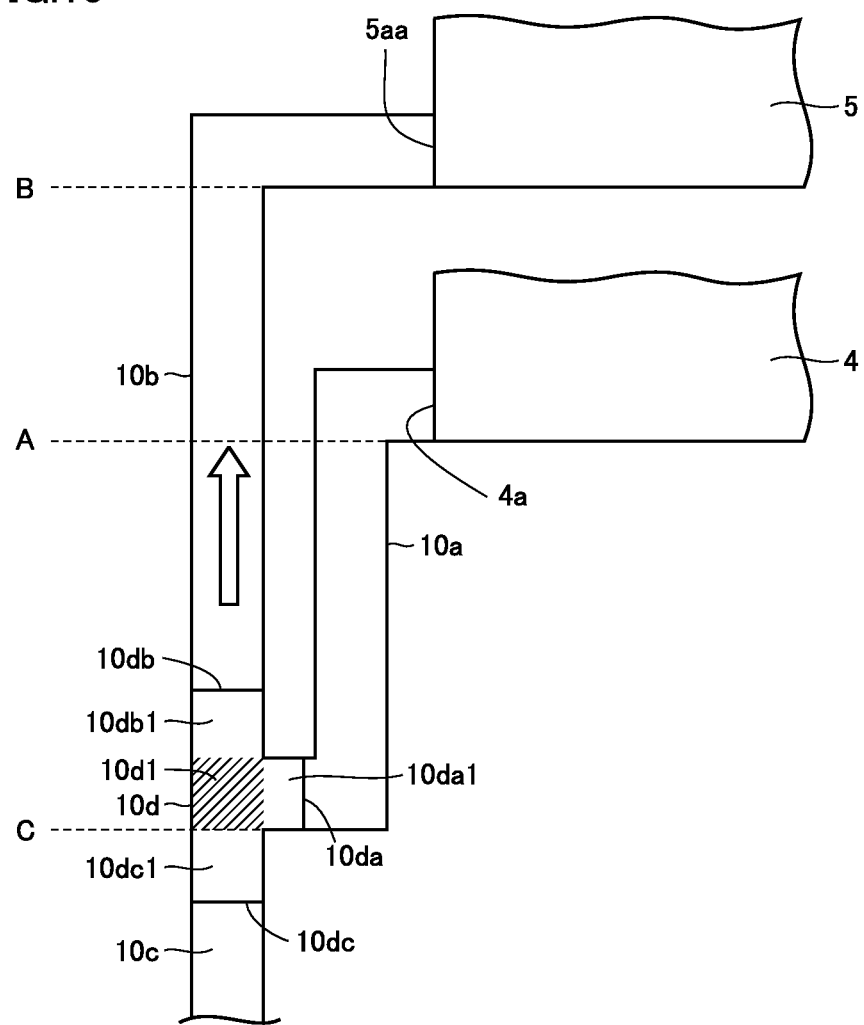
FIG. 15 is a schematic diagram for illustrating ease in discharge of drainage water in the water heater in the second embodiment of the present invention.

Referring mainly to FIGS. 14 and 15, drainage water discharge pipe 10$a$, a drain trap connection pipe 10$c$, and three-way pipe joint (pipe connection portion) 10$d$ connect drain trap 8 and drainage water discharge port 4$a$ of secondary heat exchanger 4 to each other. Drainage water discharge pipe 10$a$ has one end connected to drainage water discharge port 4$a$ of secondary heat exchanger 4 and the other end connected to opening portion 10$da$ of three-way pipe joint 10$d$. Drain trap connection pipe 10$c$ has one end connected to opening portion 10$dc$ of three-way pipe joint 10$d$ and the other end connected to drain trap 8.

One end of air passage pipe 10$b$ is connected to air suction port 5$aa$ of exhaust box 5, and the other end of air passage pipe 10$b$ is connected to opening portion 10$db$ of three-way pipe joint 10$d$.

Three-way pipe joint 10$d$ has a merge region 10$d1$ (a hatched region in FIG. 5), a flow path 10$da1$ on the side of drainage water discharge pipe 10*a*, a flow path 10*db*1 on the side of air passage pipe 10*db*, and a flow path 10*dc*1 on the side of drain trap connection pipe 10*dc*. Flow path 10*da*1 on the side of drainage water discharge pipe 10*a* is a flow path within three-way pipe joint 10*d* between merge region 10*d*1 and opening portion 10*da*. Flow path 10*db*1 on the side of air passage pipe 10*b* is a flow path within three-way pipe joint 10*d* between merge region 10*d*1 and opening portion 10*db*. Flow path 10*dc*1 on the side of drain trap connection pipe 10*c* is a flow path within three-way pipe joint 10*d* between merge region 10*d*1 and opening portion 10*dc*.

Thus, three-way pipe joint 10*d* has a flow path allowing merging of air passage pipe 10*b* and drainage water discharge pipe 10*a* (flow path 10*db*1 on the side of the air passage pipe, flow path 10*da*1 on the side of the drainage water discharge pipe, and merge region 10*d*1), and has a flow path allowing connection of the merged flow path to a discharge path leading to the outside of water heater 1 (flow path 10*dc*1 on the side of drain trap connection pipe 10*c*). In the present embodiment, the discharge path is mainly constituted of drain trap connection pipe 10*c*, drainage water discharge piping 15, and drain trap 8. Merge region 10*d*1 is a region where three flow paths (flow path 10*da*1 on the side of drainage water discharge pipe 10*a*, flow path 10*db*1 on the side of air passage pipe 10*b*, and flow path 10*dc*1 on the side of drain trap connection pipe 10*c*) merge with one another.

Drainage water discharge pipe 10*a*, air passage pipe 10*b*, drain trap connection pipe 10*c*, and three-way pipe joint 10*d* constitute pipe 10 for drainage water and air, which is branched from drain trap 8 and connected to both of secondary heat exchanger 4 and exhaust box 5.

As shown in FIG. 15, in three-way pipe joint 10*d*, a height position C of merge region 10*d*1 is arranged at a position lower than a height position B of air suction port 5*aa*. Three-way pipe joint 10*d* is arranged at such a height position that a hydraulic head pressure (mm H$_2$O) originating from a height difference between height position C and height position B is higher than an absolute value F of a maximum negative pressure (mm H$_2$O) generated at air suction port 5*aa*.

Here, "height position C of merge region 10*d*1" means a height position of any lower one of a height position of a lowermost end of a portion where flow path 10*da*1 on the side of drainage water discharge pipe 10*a* is connected to merge region 10*d*1 and a height position of a lowermost end of a portion where flow path 10*db*1 on the side of air passage pipe 10*b* is connected to merge region 10*d*1.

In the present embodiment, as shown in FIGS. 14 and 15, a lower end of flow path 10*da*1 on the side of drainage water discharge pipe 10*a* is smaller in shortest distance from an upper end of flow path 10*dc*1 on the side of drain trap connection pipe 10*c* (and the lower end of flow path 10*da*1 on the side of drainage water discharge pipe 10*a* coincides with the upper end of flow path 10*dc*1 on the side of drain trap connection pipe 10*c*). Therefore, in the present embodiment, the lower end of flow path 10*da*1 on the side of drainage water discharge pipe 10*a* is defined as height position C. "Height position B of air suction port 5*aa*" means a height position of a lower end of air suction port 5*aa*.

The "upper end" and the "lower end" of each portion of pipe 10 are defined such that an end portion of which height position is closer to a height position of fan 6 is defined as the "upper end" and an end portion farther from the height position of fan 6 is defined as the "lower end". While water heater 1 has been placed, a lowermost position in the vertical direction corresponds to the "lower end" and an uppermost position corresponds to the "upper end".

Drainage water discharge pipe 10*a* extends horizontally or as inclined downward from drainage water discharge port 4*a* to three-way pipe joint 10*d*. Thus, drainage water can smoothly flow from secondary heat exchanger 4 toward drain trap 8.

A function and effect of the water heater in the present embodiment will now be described in comparison with the comparative example shown in FIG. 7.

In the water heater in the first comparative example shown in FIG. 7, as described above, drainage water is less dischargeable toward drain trap 8 through pipe 10 for discharging drainage water and likely to stay in secondary heat exchanger 4. As described above, if drainage water may run over toward primary heat exchanger 3, overflow drainage water may corrode heat conduction pipe 3*a* of primary heat exchanger 3 composed, for example, of copper, or corrode burner 2 composed, for example, of stainless steel, or extinguish a flame of burner 2.

In contrast, according to water heater 1 in the present embodiment, as shown in FIG. 15, the other end of pipe 10 having one end connected to drain trap 8 is branched and connected to both of secondary heat exchanger 4 and exhaust box 5. Therefore, as described above, discharge of drainage water toward drain trap 8 through drainage water discharge pipe 10*a* is facilitated and drainage water is less likely to stay in secondary heat exchanger 4.

As in the first embodiment, since air passage pipe 10*b* is connected to exhaust box 5, drainage water is less likely to stay in secondary heat exchanger 4.

Since air passage pipe 10*b* is connected to exhaust box 5, a negative pressure is generated in merge region 10*d*1 and flow path 10*db*1 on the side of air passage pipe 10*b*. This negative pressure serves as force pulling drainage water from the merge region toward air suction port 5*aa*.

Therefore, even though drainage water produced in secondary heat exchanger 4 is discharged from drainage water discharge pipe 10*a* and reaches merge region 10*d*1, owing to the negative pressure as above, drainage water cannot flow toward drain trap connection pipe 10*c* but may stay in merge region 10*d*1, flow path 10*db*1 on the side of air passage pipe 10*b*, and air passage pipe 10*b*, that is, a flow path between height position B and height position C in pipe 10.

In the case above, as drainage water continues to be discharged from drainage water discharge pipe 10*a*, an amount of drainage water which stays in the flow path between height position B and height position C increases. When a level of drainage water which stays (a position of an upper end) reaches height position B of air suction port 5*aa*, drainage water may flow into exhaust box 5 through air suction port 5*aa*. When a large amount of drainage water is introduced into exhaust box 5, blowing capability of fan 6 may lower or fan 6 may be corroded.

In contrast, according to water heater 1 in the present embodiment, three-way pipe joint 10*d* is arranged at such a position that height position C is lower than height position B of air suction port 5*aa*, as shown in FIG. 15. Three-way pipe joint 10*d* is arranged such that a hydraulic head pressure (mm H$_2$O) originating from a height difference between height position C and height position B is higher than absolute value F of a maximum negative pressure (mm H$_2$O) generated at air suction port 5*aa*.

Thus, before a level of drainage water which stays in the flow path in pipe 10 between height position B and height position C reaches height position B of air suction port 5*aa*, a hydraulic head pressure of drainage water itself becomes higher than absolute value F. When a hydraulic head pressure of drainage water itself is higher than absolute value F, drainage water can easily flow into the flow path on the side of drain trap connection pipe 10c. Therefore, according to water heater 1 in the present embodiment, while flow-in of drainage water into exhaust box 5 through air suction port 5aa is suppressed, drainage water can readily be discharged toward drain trap 8 and hence drainage water can smoothly be discharged to the outside.

In particular, after a water-seal structure of drain trap 8 is water-sealed, unlike a state before the water-seal structure is water-sealed, there is no flow of air (shown with a hollow arrow in the figure) upward from below in the figure in the flow path in pipe 10 between height position B and height position C shown in FIG. 15, and hence discharge of drainage water is further facilitated.

In water heater 1 in the present embodiment, preferably, height position C is arranged at a position lower than a height position A of drainage water discharge port 4a such that a hydraulic head pressure originating from a height difference between height position C and height position A is higher than absolute value F of the maximum negative pressure generated at air suction port 5aa, for the following reasons. Here, "height position A of drainage water discharge port 4a" means a height position of a lower end of drainage water discharge port 4a.

In water heater 1 before drain trap 8 is water-sealed, drainage water discharged to drainage water discharge pipe 10a through drainage water discharge port 4a may not flow toward drain trap connection pipe 10c but may stay in flow path 10da1 on the side of drainage water discharge pipe 10a or drainage water discharge pipe 10a, that is, a flow path in pipe 10 between height position A and height position C, because of generation of a negative pressure also in drainage water discharge pipe 10a. This negative pressure serves as force which allows drainage water in the flow path between height position A and height position C to flow toward drainage water discharge port 4a.

In the case above, as drainage water continues to flow through drainage water discharge port 4a, an amount of drainage water which stays in the flow path between height position A and height position C increases. If a level of drainage water which stays (a position of an upper end) reaches height position A of drainage water discharge port 4a, drainage water may flow into secondary heat exchanger 4 through drainage water discharge port 4a.

In contrast, when three-way pipe joint 10d is arranged at such a position that height position C is lower than height position A and a hydraulic head pressure originating from a height difference between height position C and height position A is higher than absolute value F of a maximum negative pressure generated at air suction port 5aa, before the level of drainage water reaches height position A, a hydraulic head pressure of drainage water which stays in drainage water discharge pipe 10a becomes higher than an absolute value of a maximum negative pressure generated at drainage water discharge port 4a. This is because secondary heat exchanger 4 is located upstream of exhaust box 5 and an absolute value of a maximum negative pressure generated at drainage water discharge port 4a is lower than absolute value F of a maximum negative pressure generated at air suction port 5aa.

Thus, before a level of drainage water stored in the flow path in pipe 10 between height position A and height position C reaches height position A of drainage water discharge port 4a, a hydraulic head pressure of drainage water itself becomes higher than an absolute value of a negative pressure generated in drainage water discharge pipe 10a. When a hydraulic head pressure of drainage water itself is higher than a negative pressure generated in drainage water discharge pipe 10a, drainage water can readily flow into the flow path on the side of drain trap connection pipe 10c. Therefore, backflow of drainage water into secondary heat exchange 4 can be suppressed and hence drainage water can smoothly be discharged to the outside.

In the case above as well, after the water-seal structure is water-sealed, unlike a state before the water-seal structure is water-sealed, there is no flow of air upward from below in the figure in the flow path in pipe 10 between height position A and height position C shown in FIG. 15, and hence discharge of drainage water is further facilitated.

A fan discharge pressure is normally from 60 mm $H_2O$ to 100 mm $H_2O$ (588.4 Pa to 980.665 Pa). Therefore, absolute value F of a maximum negative pressure generated at air suction port 5aa is also from 60 mm $H_2O$ to 100 mm $H_2O$, or lower than that. Therefore, a height difference between height position B and height position C is preferably not less than 60 mm $H_2O$ and a height difference between height position A and height position C is also preferably not less than 60 mm $H_2O$. In consideration of an abnormal condition of the discharge path, such a height difference is further preferably not less than 100 mm $H_2O$.

Figure 16:
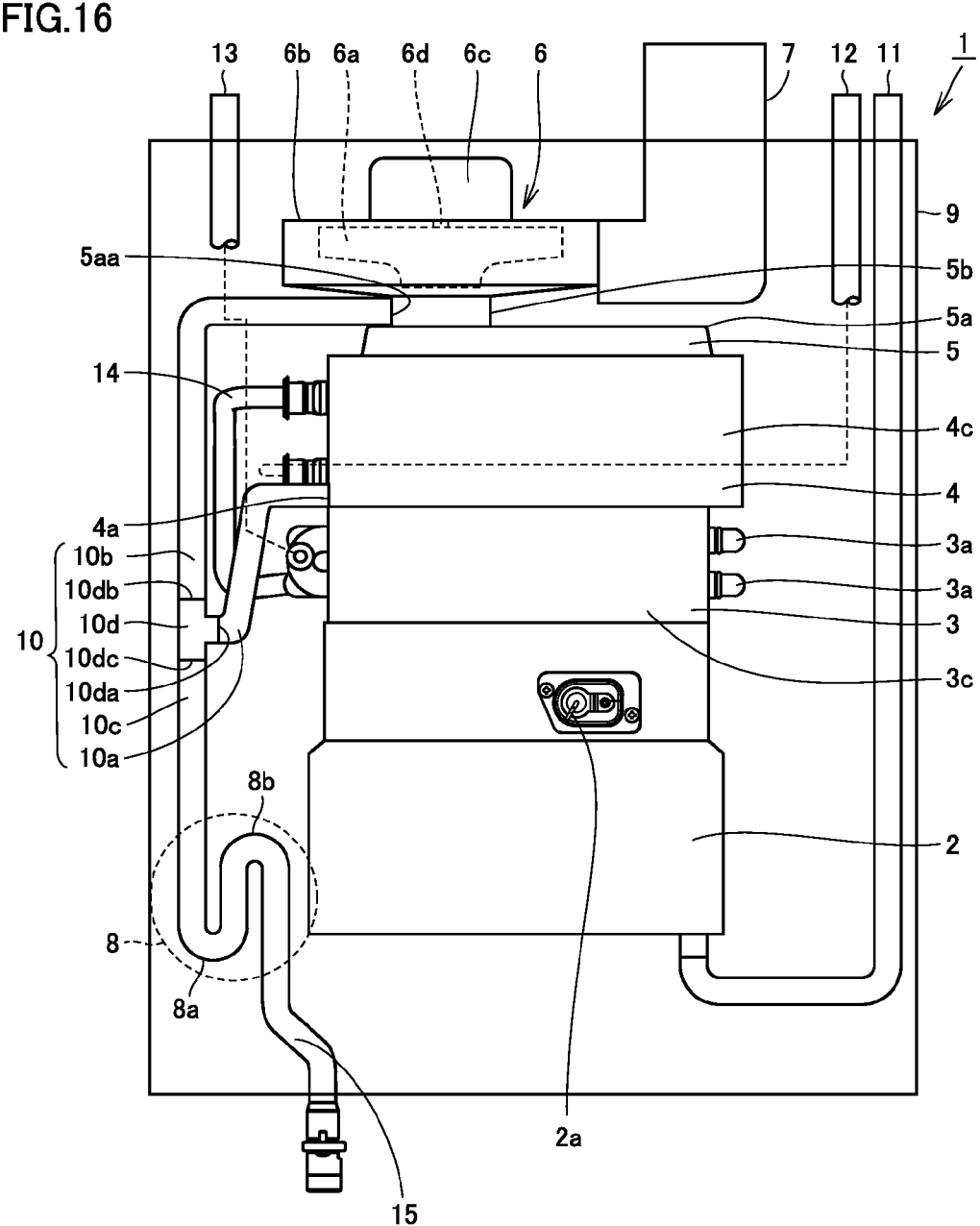
FIG. 16 is a front view schematically showing connection of the air passage pipe to a connection portion connecting an exhaust box and the fan to each other.

The feature that air passage pipe 10b is desirably connected to a path for flow of combustion gas from secondary heat exchanger 4 to fan 6 is the same as in the first embodiment. For example, as shown in FIG. 16, air passage pipe 10b may be connected to fan connection portion 5b instead of box main body 5a of exhaust box 5. In this case, discharge of drainage water from drainage water discharge pipe 10a is further facilitated.

The feature that air passage pipe 10b preferably opens into region R is also the same as in the first embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A water heater of a latent heat recovery type, capable of heating water by recovering latent heat of combustion gas, comprising:
   a burner which generates combustion gas;
   a heat exchanger which heats water which flows through inside, through heat exchange with combustion gas produced in the burner;
   a fan which suctions combustion gas which has passed through the heat exchanger and emits combustion gas to outside of the water heater;
   a drainage water discharge pipe which is connected to the heat exchanger and discharges drainage water produced as a result of recovery of latent heat by the heat exchanger to the outside of the heat exchanger;
   an air passage pipe connected to a path for flow of combustion gas from the heat exchanger to the fan; and
   a pipe connection portion which allows merging of the drainage water discharge pipe and the air passage pipe and connection of a merged flow path to a discharge path leading to the outside of the water heater,
   in the pipe connection portion, a flow path on a side of the air passage pipe being greater in diameter than a flow path on a side of the drainage water discharge pipe and a flow path on a side of the discharge path being decreased in diameter after merging of the flow path on the side of the drainage water discharge pipe and the flow path of the air passage pipe, wherein the air passage pipe is a branch path branched from the path for flow of combustion gas from the heat exchanger to the fan.

2. The water heater according to claim 1, wherein in the pipe connection portion, the flow path on the side of the discharge path extends in parallel to the flow path on the side of the air passage pipe.

3. The water heater according to claim 1, wherein in the pipe connection portion, the flow path on the side of the discharge path extends orthogonal to the flow path on the side of the drainage water discharge pipe.

4. The water heater according to claim 1, further comprising an exhaust box forming at least a part of the path for flow of combustion gas between the heat exchanger and the fan, wherein the air passage pipe is connected to the exhaust box.

5. A water heater of a latent heat recovery type, capable of heating water by recovering latent heat of combustion gas, comprising:

a burner which generates combustion gas;

a heat exchanger which heats water which flows through inside, through heat exchange with combustion gas produced in the burner;

a fan which suctions combustion gas which has passed through the heat exchanger and emits combustion gas to outside of the water heater;

a drainage water discharge pipe connected to a drainage water discharge port provided in the heat exchanger;

an air passage pipe connected to an air suction port provided in a path for flow of combustion gas from the heat exchanger to the fan; and a pipe connection portion which has a flow path allowing merging of the drainage water discharge pipe and the air passage pipe and connection of the merged flow path to a discharge path leading to the outside of the water heater, the pipe connection portion being arranged such that a height position in the pipe connection portion where a flow path on a side of the drainage water discharge pipe and a flow path on a side of the air passage pipe merge with each other is lower than a height position of the air suction port and a hydraulic head pressure originating from a height difference between the height position where merging is achieved and the height position of the air suction port is higher than an absolute value of a maximum negative pressure generated at the air suction port, wherein the air passage pipe is a branch path branched from the path for flow of combustion gas from the heat exchanger to the fan.

6. The water heater according to claim 5, wherein the pipe connection portion is arranged such that the height position where merging is achieved is lower than a height position of the drainage water discharge port and a hydraulic head pressure originating from a height difference between the height position where merging is achieved and the drainage water discharge port is higher than the absolute value of the maximum negative pressure generated at the air suction port.

7. The water heater according to claim 5, further comprising an exhaust box forming at least a part of the path for flow of combustion gas between the heat exchanger and the fan, wherein the air suction port is provided in the exhaust box.

8. The water heater according to claim 5, wherein the pipe connection portion is a pipe joint allowing merging of the drainage water discharge pipe and the air passage pipe.

9. The water heater according to claim 5, wherein the fan includes a blade, a drive source, and a rotation shaft connecting the blade and the drive source to each other, and the air passage pipe opens into a region opposed to a direction of an axis line of the rotation shaft of the blade in the path for flow of combustion gas from the heat exchanger to the fan.

* * * * *